United States Patent van Stuyvenberg

[15] 3,636,532

[45] Jan. 18, 1972

[54] PARTIALLY SWITCHING STORAGE WITH CORES CONSISTING OF MAGNETIZABLE MATERIAL

[72] Inventor: Jan Arnoldus van Stuyvenberg, Hengelo, Netherlands

[73] Assignee: N. V. Hollandse Signaalapparaten, Hengelo (Overijsel), Netherlands

[22] Filed: Nov. 3, 1969

[21] Appl. No.: 871,547

Related U.S. Application Data

[63] Continuation of Ser. No. 539,567, Apr. 1, 1966, abandoned.

[30] Foreign Application Priority Data

Apr. 3, 1965 Netherlands..........................6504262

[52] U.S. Cl. ...............340/174 M, 340/174 PA, 340/174 PC

[51] Int. Cl. .......................................G11c 5/02, G11c 11/06

[58] Field of Search..................................................340/174

[56] References Cited

UNITED STATES PATENTS

| | | | |
|---|---|---|---|
| 3,387,289 | 6/1968 | Walter | 340/174 |
| 3,321,749 | 5/1967 | Overn | 340/174 |

*Primary Examiner*—James W. Moffitt
*Attorney*—Frank R. Trifari

[57] ABSTRACT

A magnetic core storage device employing a plurality of cores having word and write conductors, a driving circuit for supplying word pulses having a magnitude for generating a field exceeding the saturation field required for each core. The word pulse has a short duration which restricts the core magnetization. Coincident writing and reading pulses are supplied on corresponding write conductors, and the control circuit further supplies supplemental pulses to the write conductor in a direction opposite to that of the first write conductor pulse and not overlapping the word control pulse.

3 Claims, 4 Drawing Figures

PATENTED JAN 18 1972 3,636,532

INVENTOR
J. A. VAN STUYVENBERG
BY
Frank R. Trifari
AGENT

INVENTOR
J. A. VAN STUYVENBERG

BY
Frank R. [signature]
AGENT

PARTIALLY SWITCHING STORAGE WITH CORES CONSISTING OF MAGNETIZABLE MATERIAL

This application is a continuation of application Ser. No. 539,567, filed Apr. 1, 1966, and now abandoned.

This invention relates to a magnetic storage device including cores consisting of magnetizable material. In each of the cores, for the purpose of reading as well as of writing, a magnetic field can be induced by a pulse in a conductor coupled to such a core or by the cooperation of overlapping or coinciding pulses in a number of conductors coupled to such a core. In this type of selection, the strength of field is considerably greater than the field strength otherwise normally required for causing saturation of the core material, the field being maintained for an interval that is sufficiently short such that the magnetization of the cores resulting therefrom is restricted, that is to say the magnetization does not reach the value which eventually would be reached under the influence of the applied field strength.

Storages of this type are called "partially switching storages." Partial switching permits reading and writing speeds that are considerably higher than those reached in storages operating with weaker write- and read-fields, but allow the cores a much longer interval to adjust themselves to these fields. The known partially switching storages, however, supply considerably lower reading voltages than other storages with magnetic cores. The greatest difference between the magnetization of cores storing bits of different character, or between the magnetizations of the two cores storing a bit in a two-core-per-bit storage, and consequently, the greatest difference between the reading voltages supplied for a 0 bit and for a 1 bit, or, in a two-core-per-bit storage, the highest reading voltage, is restricted by the fact that certain pulses used to obtain the magnetization also induce fields in cores that do not partake in the writing operation to be effected, but are nevertheless coupled to the wire carrying said pulses. For instance, in a storage that comprises a number of lines, each of them storing a word and selected by a current pulse in a word-conductor coupled to each of the cores belonging to said line as well as a number of reading- and/or writing-conductors each of which is coupled to corresponding cores in different lines, a pulse in a conductor of the latter type, supplied for the purpose of writing information in a line selected by a pulse in a word-conductor, also induces fields in cores not belonging to the selected line but coupled to the write-conductor. Such a pulse should not influence the magnetization of such a core to such an extent that the information stored by it is changed. Such stored information should not be changed, even if the core is subjected to the influence of a large number of write-pulses before it is read. This implies a restriction of the amplitude of the write-pulses, and for this reason in various cases the pulses in the word-conductor supply a much greater contribution to the field in the cores than the pulses in the write-conductors.

It has been established that the magnetization of cores in a partially switching storage is more easily influenced by substantially weaker fields than the magnetization of cores in storages of other types. Hence, in partially switching storages, the restrictions to which pulses in conductors that are also coupled to cores that are not to partake in a switching operation to be effected by these pulses are subjected, are very severe. These restrictions are actually considerably more severe than the corresponding restrictions in other types of storages. Although the magnetic fields induced in cores to be switched are much stronger, the pulses in conductors that are also coupled to other cores must be weaker. Consequently the contribution to the field in the cores supplied by the conductor that is not coupled to cores not partaking in the operation to be effected must be very large as compared with that of conductors (such as the write-conductors) that are coupled to core not partaking in said operation. Hence partially switching storages supply lower reading voltages, so that their noise level is relatively higher than that of other storages and they require more amplification than other storages.

It is the main object of the present invention to reduce the drawbacks mentioned above of the partially switching storages and to create a storage of this type in which the restrictions to which pulses in conductors that are also coupled to cores not partaking in the switching operation to be effected are subjected, are less stringent. According to the present invention we provide a magnetic storage with cores consisting of magnetizable material, in each of which cores, for the purpose of reading as well as of writing, a magnetic field can be induced by a pulse in a conductor coupled to such a core or by the cooperation of overlapping or coinciding pulses in a number of conductors coupled to such a core. The strength of the field is considerably greater than the field strength required for causing saturation of the core material, the field being maintained for an interval that is so short that the magnetization of the core resulting therefrom is restricted or in other words does not reach the value which eventually would be reached under the influence of the applied field strength. Either before or after a pulse has been supplied to a conductor which, except for at least one core that is to partake in the operation to the causing of which that pulse contributes, is also coupled to cores that are not to partake in this operation, a control circuit causes, at any rate if said pulse has a predetermined direction, a supplementary pulse having a direction opposite to that of the former pulse, to be supplied to the same conductor, or to a conductor coupled to the same cores as the conductor carrying said former pulse.

To be sure, also in the storage according to the invention, the contribution to the field in the cores supplied by the pulse in a conductor that is only coupled to cores the magnetization of which is to be influenced, is considerably larger than that of a pulse in a conductor that is also coupled to cores the magnetization of which is not to be influenced, but as a result of the application of the invention the amplitude of the pulses in conductors of the latter type can be substantially increased so that the reading voltages can be much higher or the differences between reading voltages for bits of different types can be much greater.

It will be shown below that in various types of storages it is much easier to change the magnetization of cores in the one direction than in the other. In such a type of storage it may be recommendable to supply the supplementary pulse according to the invention only when it has the direction in which it has the smallest influence on the magnetization. As a rule, however, it is desirable to combine each pulse in a conductor that is also coupled to cores, the magnetization of which is not to be influenced, with a supplementary pulse of opposite direction according to the invention.

In a storage matrix of the type described above a word-conductor coupled to the cores of a line used to store a word, is only coupled to cores partaking in the operation controlled by pulses in that word-conductor. All the cores on that line are to be influenced by the pulses flowing in the word-conductor allotted to said line. Hence, a pulse in such a word-conductor need not be combined with a supplementary pulse according to the invention. During the writing operation a pulse in such a word-conductor cooperates with pulses in write-conductors, each of which is coupled to corresponding cores of different lines. Such a write-conductor is therefore coupled to cores that do not partake in the writing operation to be effected in the line selected by a pulse in a word-conductor allotted to said line, and for this reason a pulse in such a write-conductor must be combined with a supplementary pulse according to the invention. The pulses in the word-conductor supply the greater part of the filed effecting the writing.

A supplementary pulse according to the invention flowing through a certain conductor of a storage should not overlap the pulse that cooperates with the pulse to which the supplementary pulse is added in order to write information in a certain core and that flows through another conductor of the storage, because otherwise the supplementary pulse would at least partially cancel the results of the writing operation.

A very effective embodiment of a storage according to the invention with magnetizable cores comprise a number of word- or selecting-conductors, each magnetically coupled to at least one core, and a number of write-conductors, each coupled magnetically to at least two cores that are each also coupled to a word- or selecting-conductor, as well as a control circuit arrangement that, during a writing operation, on the one hand causes the supply to a word- or selecting-conductor of a pulse which has a predetermined direction and such an amplitude that it induces a magnetic field that is considerably stronger than the field required for saturation of the core material in each core coupled to the word-conductor, but which field has such a short duration that the magnetization obtained is restricted, and on the other hand causes a pulse, this at least overlapping the pulse in the word-conductor and having an amplitude and/or direction that is determined by the bit to be written, to be supplied to at least a part of the write-conductors coupled to cores that are also coupled to said word-conductor and finally, at any rate, when a pulse in a write-conductor has a predetermined direction, causes each pulse in such a write-conductor to be preceded or followed by a supplementary pulse of a direction opposite to that of the former pulse and not overlapping the pulse in the word-conductor.

It is not necessary for a supplementary pulse to flow through the same conductor as the pulse contributing to a switching operation to which it is added. In certain embodiments the supplementary pulse flows through a separate circuit coupled to the same cores. This may lead to a less complicated control circuit. As a rule, however, the pulses will flow in the same circuit.

The invention will now be elucidated by describing embodiments with reference to the annexed drawings.

The invention will now be elucidated by describing its application to a storage matrix. The application of the invention is, however, by no means restricted to storages in matrix shape; it can be applied to any storage that satisfies the definition given in the preamble of this specification.

Figure 1:
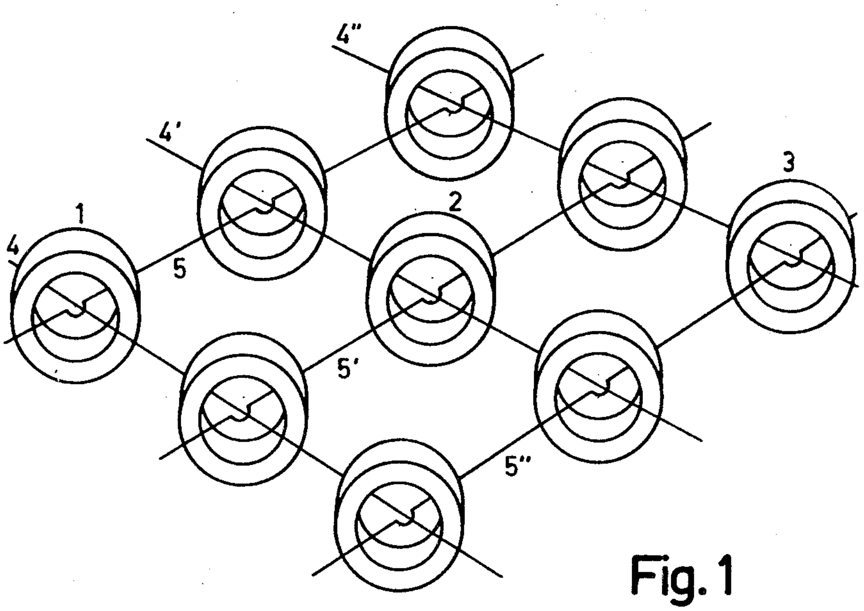
FIG. 1 shows a part of a storage matrix.

FIG. 1 shows a part of such a storage matrix with ring-shaped cores. Three of these cores are designated by the references 1, 2, and 3. Furthermore the figure shows a number of write- and read-conductors, each related to a certain bit and a certain column in the matrix and designated by the references 4, 4′ and 4″, as well as a number of word- or selection-conductors 5, 5′ and 5″, each of them allotted to a line in the matrix and each of them coupled to each core of the line to which it is allotted. When a line is to be read, or information is to be written in that line, a current pulse flows through the word- or selection-conductor for said line. Because the storage to be described is a partially switching one the amplitude of the pulse flowing through said conductor during the writing operation as well as during the reading operation is so large, that the field induced by it in the cores is considerably stronger than is required for obtaining complete saturation of the core material, but the duration of this pulse is so short, that nevertheless, the magnetization obtained remains restricted. As has been elucidated above such strong pulses are only permissible in conductors that are not coupled to cores that do not partake in the operation to be causes by these pulses, in order that the magnetization of such cores will not be altered by these strong pulses.

The reading operation requires only one pulse, which flows through the word- or selection-conductor allotted to the line to be read. All cores of this line partake in the reading operation, and the word-conductor is coupled to no other cores, so that there is no objection to the flowing of a sufficiently strong pulse through said conductor.

Figure 2:
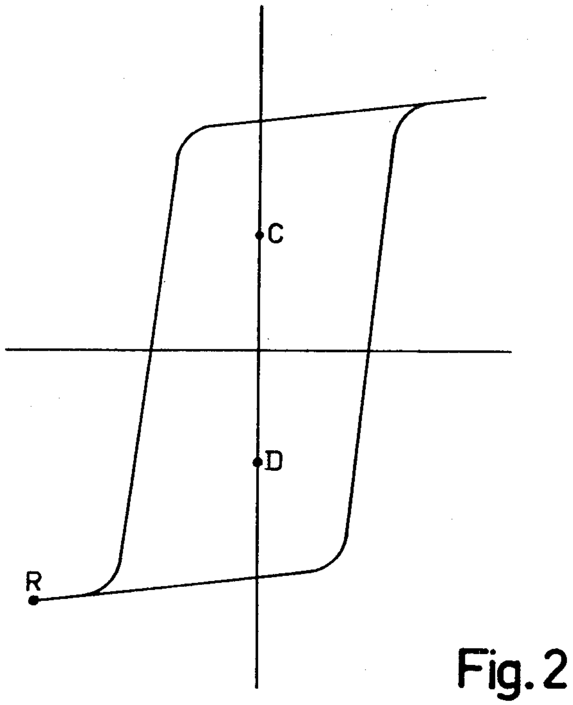
FIG. 2 shows an idealized magnetization curve of a frequently used core material.

Duration and amplitude of this pulse are such that, after it has come to an end, the magnetization of each core in the line to be read has reached the value represented by the point R in the magnetization curve of FIG. 2.

Also during the writing operation a pulse flows in the selection-conductor allotted to the line in which information is to be written. Its direction is opposite to that of the read-pulse, and in the embodiment described its amplitude is slightly smaller than that of the read-pulse, although this amplitude is still considerably larger than is required for obtaining saturation of the cores coupled to the selection-conductor. Writing always takes place after reading, so that the core material starts the writing operation from the magnetization represented by the point R. In the embodiment described, duration and amplitude of the write-pulse in the selection-conductor are such, that if no other pulses are operative, the magnetization of each core of the line will change from the value represented by the point R to the value represented by the origin of the coordinate systems of the magnetization curve, although embodiments have been conceived using other pulse strengths and durations resulting in other values of this magnetization. Apart from the pulse in the selection-conductor, other pulses, occurring simultaneously with or overlapping the former pulse, flow, during the write-operation, through the write- and read-conductors coupled to cores that are also coupled to the selection conductor carrying a pulse at that moment. The amplitudes of these write-pulses are considerably smaller than the amplitude of the pulse flowing in the selection-conductor, so much smaller that they can no more than slightly change the magnetization of cores in other lines than that to which the selection-conductor carrying a pulse at that moment is allotted, even if these cores are subjected to a large number of these write-pulses. In the embodiment described this write-pulse always has the same amplitude, while its direction depends on the bit to be written. If the pulses in the selection conductor and in the write- and read-conductor induce magnetic fields of opposite direction in a core, the magnetization reached will differ less from that represented by the point R than if no write-pulse has been received. Be it assumed that in this case, after the pulses have come to an end, the magnetization of the core is represented by the point D. If the fields induced by the two pulses support each other, the magnetization reached will differ more from that represented by the point R than if no write-pulse has been received. Be it assumed that in this case, after both pulses have come to an end, the magnetization of a core subjected to their influence can be represented by the point C.

After a line has been read, all cores have been returned to the condition represented by the point R of the magnetization curve, and in doing so they induce voltages in the write- and read-conductors to which they are coupled, which voltages are determined by the amplitude of the change in magnetization effected during this return. Consequently, during reading, a core that is in a condition that can be represented by the point C induces a voltage pulse with a larger amplitude than a core the condition of which can be represented by the point D. In this way, during the reading operation it is possible to distinguish between cores storing bits of different character. In a storage with one core per bit these amplitudes will have to be distinguished by means of threshold circuits; in storages with two cores per bit the reading loop supplies a reading voltage equal to the difference between the voltages induced by the two cores for the same bit and having a direction determined by the position in the loop of the core the magnetization of which is represented by the point C. In both cases it is desirable for the magnetizations represented by the points C and D to differ as much as possible. It is to be noted that it is by no means necessary for the magnetization reached without the application of a pulse to a write- and read-conductor to be such that it can be represented by the origin of the coordinate system of the magnetization curve. Furthermore it is by no means necessary for the points C and D to be symmetrically situated with respect to this origin. In a storage with one core bit as well as in a storage with two cores per bit the situations of these points are determined by the amplitude and duration of the pulse in the selection conductor, and by the amplitude and direction and, to a certain extent, the duration of the pulses representing bits of different character in the write- and read-conductors. Moreover, especially in storages with one core per bit, it would be possible to use pulses of different amplitude in the write-conductors for bits of different character. The use of pulses of the same amplitude but opposite direction in the write-conductors for representing bits of different character is, however, preferable, because in this way degeneration of information in cores that are coupled to a write-conductor, but do not partake in a writing operation to be effected, can remain smaller.

Strong pulses in the write-conductors lead to large differences in magnetization and hence to high reading voltages or large differences between reading voltages for bits of different character, so that it would appear to be desirable to use such strong write-pulses. There are, however, stringent limitations to the increase in the amplitude of the write-pulses. Each write-conductor is coupled to cores that do not partake in the writing operation because they belong to lines the selection conductors of which do not carry a pulse, and strong write pulses in these write-conductors might nevertheless change the magnetization of such cores. The greater part of these cores store information. Magnetization corresponding to the point D, and representing a certain type of information, will be changed to magnetization differing less from that corresponding to the point C, representing the other type of binary information, by pulses applied to obtain the latter type of magnetization. Write-pulses of opposite direction have a similar effect on information represented by the magnetization corresponding to the point C. It has been established that a partially switching storage is more susceptible to these phenomena. Obviously, in a storage that does not switch partially, the cores are also subjected to the influence of pulses used to switch other cores, but after these pulses have causes a relatively small variation in the magnitude of the magnetization of these cores, no further degeneration in the stored information takes place. In a partially switching storage, however, a considerably larger number of successive pulses in a write-conductor appears to be able to change the magnetization of a core, so that the measure of degeneration is determined by the amplitude and the duration as well as by the number of pulses influencing a core, and if stabilization should take place, it is, at any rate, reached at a considerably lower level of the difference between the magnetization of cores storing different types of information or of the two cores for the same bit in a two-cores-per-bit storage. It is impossible to predict how many pulses of either direction will influence a core before it is read; this number of pulses is determined by circumstances. Consequently it is impossible to predict the amplitude of the reading voltage pulse obtained from such a core. In order to avoid these disadvantages of the partially switching storages it would be necessary to reduce the amplitude of the write-pulses to such an extent that the difference between the reading voltages for bits of different character in a storage with one core per bit would become very small, and the reading voltages in a storage with two cores per bit would become very low. Consequently, the noise level in the output of the known partially switching storages is high, while they require considerable amplification. As a rule, in a partially switching storage according to the invention, a pulse flowing through a conductor which is coupled to cores not partaking in the switching operation to be performed is combined with a supplementary pulse of opposite direction in the same conductor. In the storage to be described below such pairs of pulses flow through the write-conductors. One of these pulses coincides with or overlaps the pulse in the selection-conductor. This pulse cooperates with the pulse in the selection-conductor in order to effect the writing of the information in the selected core. All not selected cores coupled to the same write-conductor are subjected to two successive oppositely directed influences as a result of the writing of information in one of the cores coupled to the write-conductor. Hence, independently of the number of write-operations effected by pulses flowing through the write-conductor to which a core is coupled, this core is subjected to as many influences in the one direction as in the other before it is read, so that the total change in the magnetization of such a core remains very small. Only once will a pulse be supplied that is able to influence such a core in an adverse direction, and this occurs when the supplementary pulse, added to the pulse that effects the writing operation in the core under consideration, is received, for this pulse is not combined with a pulse of opposite direction that does not partake in the writing. It would be possible to reduce the unfavorable influence of this supplementary pulse to a certain extent by supplying it before the write-pulse to which it belongs occurs.

The effect of the application of the invention is surprising. Considerably stronger write-pulses can be used without unacceptable degeneration of stored information. This makes it possible to obtain considerably stronger reading pulses from partially switching storages.

In certain types of partially switching storages the magnetization of the core changes more easily in the one direction than in the other. Generally the magnetization changes are more easily in the direction of the quiescent condition from which the writing operation starts than in the opposite direction. This will especially be the case if the writing operation starts from a magnetization which approximates saturation, such as the magnetization represented by the point R of the magnetization curve shown in FIG. 2. In storages of this type according to the invention it may be desirable to refrain from the application of the supplementary pulse should its direction be such that it would change the magnetization in the sense in which it changes easily. In other embodiments of this type, the amplitude of the supplementary pulse depends on its direction; if its direction is such that the pulse tends to change the magnetization in the direction in which it is more easily changed its amplitude is smaller than that of a pulse with the opposite direction. As a rule, however, it suffices to supply successively two oppositely directed pulses of equal amplitude to a conductor which is also coupled to cores that do not partake in the switching operation to be effected.

Summarizing the foregoing, and referring to FIG. 1, word selection lines 5, 5′, 5″ thread a plurality of cores in a first direction and read-write lines 4, 4′, 4″ thread the same array of cores in a second direction. A read-operation results from placing a word line selection pulse along a desired word line such as line 5. Since all cores along the word line are read, no coincident pulse is needed, and the word line selection pulse can be of sufficient magnitude to read each core. The write operation also requires a pulse applied to a desired word line, such as line 5, of a magnitude slightly smaller than the read-pulse and of an opposite direction. The magnitude of the pulse is still considerably larger than required for saturation, but is limited in duration to restrict the magnetization at a lower level. Coincident, or at least partially coincident, with the word line pulse, write-pulses flow through desired ones of the read-write lines 4, 4′, 4″. The amplitude of the write-pulses are considerably smaller than the amplitude of the pulse flowing in the selection-conductor (e.g., line 5). In partially switching stores, subject to large numbers of successive pulses along a write-conductor, degeneration of magnetization of nonselect cores to which a write-pulse is coupled can occur. To counter this effect, each pulse flowing through a write-conductor coupled to nonselected cores is combined with a supplementary pulse of opposite direction flowing through the same conductor. One of the pulses cooperates with the pulse flowing through the selection conductor to write information into a selected core. The nonselected cores coupled to the same write-conductor (4, 4′, 4″) receiving the pair of opposite pulses react by showing only a very small change in magnetization.

Figures 3, 4:
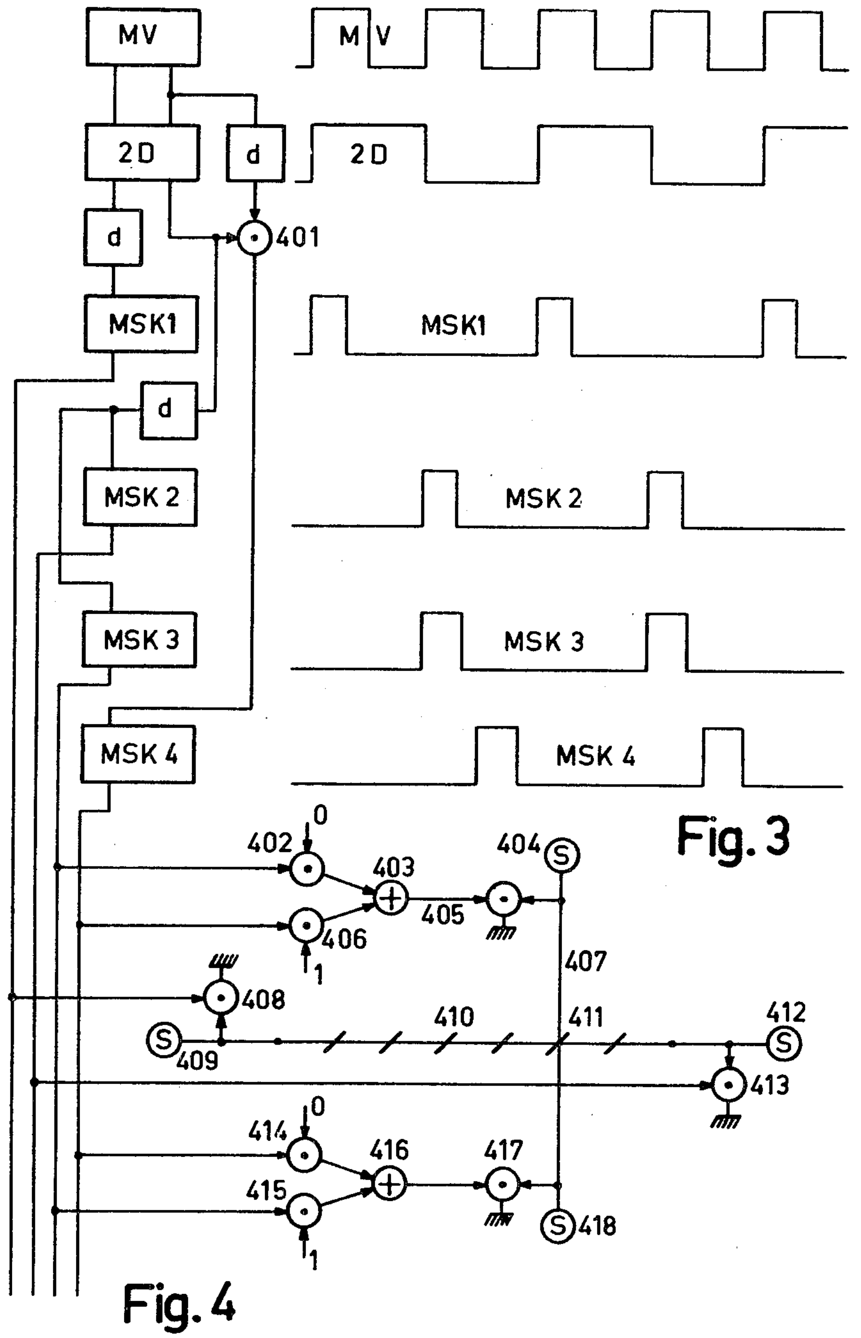
FIG. 3 shows various time diagrams related to a control circuit arrangement for a storage according to the invention.
FIG. 4 shows the control circuit arrangement for a storage according to the invention to which the diagrams shown in FIG. 3 apply.

With reference to FIG. 3, an embodiment of a control circuit for a storage according to the invention will now be described. The complete arrangement, including the data handling system to which the storage belongs, is controlled by control pulses supplied by a multivibrator MV. This multivibrator supplies the pulses represented by the curve MV in FIG. 3. These pulses control a frequency divider 2D that then supplies the pulses represented by the curve 2D. The voltage supplied by the left output circuit of this frequency divider is differentiated in the differentiator which carries the reference *d*, just as the other differentiators shown in the figure. The short pulse derived by means of this differentiator from the leading edge of a pulse supplied by the left output circuit of the frequency divider 2D sets the monostable trigger circuit MSK1. As a result of its repeated setting this monostable trigger circuit supplies the pulses which are represented by the curve MSK1 in FIG. 3, and which controls the supply of read-pulses to the storage. For simplicity's sake the selectors that lead the various pulses to the various selection-conductors and write-conductors are not shown in the figure. These selectors have nothing to do with the application of the invention, and may be inserted in one of the well-known ways between the sources of pulses and the various conductors of the storage. The pulse that flows in the selection-conductor during a reading operation is supplied by a source of constant current 409 when the short circuit of this source consisting of the AND-circuit 408 is interrupted. The pulses supplied by the monostable trigger circuit MSK1 control this interruption. The current supplied by the sources 409 then flows through the conductor 410 and the AND-circuit 413, which is conductive at that moment, to ground.

The voltage supplied by the right output circuit of the frequency divider 2D is differentiated in a second differentiator *d*, and each pulse derived from a leading edge of a pulse supplied by this output circuit, which edge coincides with a trailing edge of one of the pulses represented by the curve 2D, sets the monostable trigger circuits MSK2 and MSK3. As a result of its repeated setting the monostable trigger circuit MSK2 supplies the pulses represented by the curve MSK2 in FIG. 3, which control the pulses that are to flow through the selection-conductor 410 during the write-operations. For this purpose such a pulse, supplied by the trigger circuit MSK2, makes the AND-circuit 413 nonconductive, as a result of which a current supplied by the source 412 temporarily flows through the conductor 410 and the AND-circuit 408, which now is conductive, to ground. The direction of these pulses supplied by the source 412 is opposite to that of the read-pulses supplied by the source 409. As a result of its repeated setting the monostable trigger circuit MSK3 supplies the pulses represented by the curve MSK3 in FIG. 3. The duration of these pulses is slightly longer than that of the pulses controlling the current in the selection-conductor. The pulses MSK3 control the pulses in the write-conductors that overlap the pulses in the selection-conductor. It is necessary that the direction of these pulses depends on the bit to be written. For this purpose the write-conductor 407 can be fed either by the source 404 or by the source 418, both for constant current but with opposite voltage direction. In the quiescent condition no current should be supplied, and for this reason, in the quiescent condition, the source 404 is short circuited by the AND-circuit 405, while the source 418 is short circuited by the AND-circuit 417.

The pulse MSK3 permits either the AND-circuit 402 or the AND-circuit 415 to become conductive. The voltage representing the bit to be written which is supplied to a second input circuit of each of the AND-circuits 402 and 415 during the interval in which the voltage 2D is low, determines which of these two AND circuits actually becomes conductive. If a 0 bit is to be written, the second input circuit of the AND-circuit 402 obtains such a voltage that the AND circuit becomes conductive for the pulse MSK3, so that this pulse causes the output voltage of the OR-circuit 403 to obtain a value differing from the quiescent value, and the AND-circuit 405 to become nonconductive for the current supplied by the source 404 which current therefore flows through the write-conductor for the duration of the pulse MSK3. It is to be noted in this connection that either the character of the two AND-circuits 402 and 405 is different, the AND-circuit 402 is being made conductive by a voltage increase, while the AND-circuit 405 is made conductive by a voltage decrease, the directions of the voltages of the sources 404 and 418 being adapted thereto, or an invertor must be inserted between the two AND circuits. Such measures, however, are well known in the art and need not be described in detail. As a result of the fact that the AND-circuit 405 becomes nonconductive, during the writing of a 0 bit a pulse with a direction that is determined by the direction of the voltage of the source 404 flows through the write-conductor 407. If, on the other hand, a 1 bit is to be written, the lower input circuit of the AND-circuit 415 obtains such a potential that the AND circuit becomes conductive for the pulse MSK3, so that this pulse can pass OR-circuit 416 and make AND-circuit 417 nonconductive for the current supplied by the source 418, which is then no longer short circuited and, for the duration of the pulse MSK3 supplies a pulse, the direction of which is opposite to that of the pulse supplied by the source 404, to the conductor 407.

All three pulses MSK1, MSK2, and MSK3 have a shorter duration than the pulses supplied by the multivibrator MV, and they are, moreover, shorter than half the duration of a pulse supplied by the frequency divider 2D. Consequently, shortly after the occurrence of the trailing edge of the pulse MSK3, the trailing edge of a pulse supplied by the multivibrator MV will occur. At the moment at which this trailing edge is received, the right output circuit of the multivibrator MV supplies the leading edge of an inverted pulse and a differentiator *d* connected to this right output circuit of the multivibrator will then supply a short pulse that can flow through the AND-circuit 401 when the right-hand output circuit of the frequency divider 2D supplies a high voltage, which will be the case during the interval between two successive pulses supplied by the left output circuit of the frequency divider. During this interval a pulse supplied by the said differentiator will set the monostable trigger circuit MSK4, which then supplies the pulses represented by the curve MSK4 in FIG. 3. These pulses control the supply of the supplementary pulses. If a 1 bit has been written, the pulse MSK4 can pass the AND-circuit 406 because the lower input circuit of this AND circuit receives the voltage representing the 1 bit. By way of OR-circuit 403, this pulse reaches the coincidence circuit 405, which it makes nonconductive, thus removing the short circuit from the source 404, so that a supplementary pulse of a direction opposite to that of the preceding write-pulse flows through the write-conductor 407. Its amplitude is equal to the amplitude of a write-pulse. Hence, after a 1 bit has been written, a supplementary pulse of the required direction is supplied. If a 0 bit has been written, in similar way, the pulse MSK4 can pass the AND-circuit 414 because of the upper input circuit thereof receives the 0 bit voltage. By way of OR-circuit 416, pulse MSK4 reaches coincidence circuit 417, which it makes nonconductive, so that the short circuit of the source 418 is interrupted, and also in this case a supplementary pulse of the required direction is supplied.

In the arrangement described above the supplementary pulse follows on the write-pulse. A reversed sequence of these pulses can be obtained by a slight change in the circuit arrangement. For this purpose the control circuit of the monostable trigger circuit MSK4 is connected to the output circuit of the differentiator which, in FIG. 4, controls the trigger circuits MSK2 and MSK3, while the control circuits of these two trigger circuits are connected to the output circuit of the AND-circuit 401. In this circuit arrangement the pulse MSK4, that controls the generation of the supplementary pulse according to the invention, will start simultaneously with the occurrence of a trailing edge of the curve 2D, while the pulses MSK2 and MSK3 will start simultaneously with that trailing edge of a pulse MV that occurs while the pulse voltage supplied by the frequency divider and represented by the curve 2D has its lowest value.

In the above only storages according to the invention have been described in which the magnetization of cores is caused by two overlapping pulses in two conductors, only one of these conductors being coupled to cores that do not partake in the switching operations to be effected. The application of the invention is, however, by no means restricted to storages of this type. It can also be applied in storages in which the magnetization is caused by a larger number of overlapping pulses in more than two conductors. One of these conductors must only be coupled to those cores that partake in the switching operations to be effected, so that the pulses flowing in this conductor can supply the larger part of the field required.

If supplementary pulses according to the invention flow through more than one conductor it may be necessary to take measures for the purpose of preventing the cooperation of these pulses from causing changes in the magnetization of cores that do not partake in the switching operation to be effected. In storages of this type it may be desirable to supply the supplementary pulses that flow in different conductors, coupled to at least one common core, at different conductors, coupled mutually shifted moments. Such a mutual shift of supplementary pulses prevents these pulses from cooperating. In the case of supplementary pulses being supplied to two conductors coupled to at least one common core such a shift can be obtained by supplying one of the supplementary pulses before the other after the pulse with which they are combined.

I claim:

1. Magnetic storage device comprising a plurality of cores of magnetizable material, and having a plurality of word-conductors and a plurality of write-conductors each magnetically coupled to a plurality of cores, at least one of said write-conductors and one of said word-conductors providing coincident definition of a core location, said write-conductor coupled to a plurality of cores not all magnetically coupled to the same word-conductor, means for applying a first pulse to a selected one of said word-conductors, each said word-conductor responsive to said first pulse for inducing a magnetic field in said plurality of cores coupled to said word-conductor, the strength of said field being considerably greater than the field strength required for causing saturation of the core material, means for maintaining said field for so short an interval that the magnetization of the core material does not reach the value which would eventually be reached under the influence of the applied field strength, means for applying to said write-conductor a second pulse at least partially overlapping with said first pulse, said write-conductor coupled to a common core also coupled to the word-conductor responsive to said first pulse, said first and second pulse together creating a field sufficient to exceed saturation and switch said common core, and a control circuit providing a supplementary pulse for providing a field having a direction opposite to that of said second pulse, and nonoverlapping with respect to said first pulse, said supplementary pulse coupled to the same cores as the conductor carrying said second pulse.

2. Magnetic storage according to claim 1, wherein the first pulse and the supplementary pulse flow through the same conductor.

3. A magnetic storage device comprising a plurality of cores of saturable magnetizable material arranged in a two-core-per-bit configuration, a plurality of word-conductors such coupled to at least one pair of cores per bit, a plurality of write-conductors each coupled to at least two such pairs of cores, each of said pairs coupled to a respective word-conductor, a control circuit coupled to said word-conductors and supplying thereto a first pulse of a predetermined direction and an amplitude such that said pulse will induce a magnetization field exceeding the field required for saturation of the core material of each core coupled to the word-conductor, said induced field having a short duration, thereby restricting said magnetization to a level insufficient for switching the core state, means coupling said control to said write-conductors and supplying a second pulse, said second pulse at least overlapping said first pulse and having an amplitude and direction determined by the bit to be written in a core and being supplied to the write-conductors coupled to common cores which are coupled to said word-conductors receiving said first pulse, said first and second pulses together creating a field sufficient to exceed saturation and switch said common cores, said control circuit responsive to said second write-conductor pulse of a predetermined direction for supplying a third pulse, to the said write-conductor receiving said second pulse, and a direction opposite to said second pulse and noncoincident with said first pulse.

* * * * *

PO-1050
(5/69)

UNITED STATES PATENT OFFICE
CERTIFICATE OF CORRECTION

Patent No. 3,636,532 Dated January 18, 1972

Inventor(s) JAN ARNOLDUS VAN STUVYVENBERG

It is certified that error appears in the above-identified patent and that said Letters Patent are hereby corrected as shown below:

Column 5, line 2, after "core" insert --per--.

line 40, "causes"should be --caused---.

Column 6, line 25, cancel "are".

Column 8, line 55, cancel "of".

Column 9, line 22, cancel "conductors"

line 23, cancel "coupled".

line 28, after "fore" insert --and--.

Claim 2, line 1, cancel "the first" and insert --said second--.

line 2, cancel "the" and insert --said--.

Claim 3, line 3, "such" should be --each--.

line 24, after "and" insert --of--.

Signed and sealed this 12th day of September 1972.

(SEAL)
Attest:

EDWARD M.FLETCHER,JR.
Attesting Officer

ROBERT GOTTSCHALK
Commissioner of Patents